United States Patent [19]

Yoshida

[11] Patent Number: 5,236,635
[45] Date of Patent: Aug. 17, 1993

[54] METHOD FOR MANUFACTURING RETARDATION FILM

[75] Inventor: Toru Yoshida, Kanagawa, Japan

[73] Assignee: Fuji Photo Film Co., Ltd., Kanagawa, Japan

[21] Appl. No.: 846,075

[22] Filed: Mar. 5, 1992

[30] Foreign Application Priority Data

Mar. 11, 1991 [JP] Japan .................................. 3-69438

[51] Int. Cl.$^5$ ............................................. B29C 71/02
[52] U.S. Cl. ...................................... 264/1.4; 264/26; 264/40.6; 264/40.7; 264/216; 264/234; 264/288.4; 264/345; 264/204
[58] Field of Search ................... 264/1.3, 40.1, 40.6, 264/26, 40.7, 212, 213, 216, 232, 234, 235, 235.6, 235.8, 342 R, 342 RE, 346, 1.4, 288.4, 204; 359/73; 427/163

[56] References Cited

U.S. PATENT DOCUMENTS

| | | | |
|---|---|---|---|
| 2,260,501 | 10/1941 | Wynd | 264/235 |
| 2,904,841 | 9/1959 | Haugh | 264/40.7 |
| 3,197,538 | 7/1965 | Capron et al. | 264/235 |
| 3,515,780 | 6/1970 | O'Connell et al. | 264/342 RE |
| 4,614,634 | 9/1986 | Weber et al. | 264/1.3 |
| 4,847,033 | 7/1989 | Carroll, Jr. | 264/346 |
| 4,904,425 | 2/1990 | Hebels et al. | 264/40.6 |
| 5,138,474 | 8/1992 | Arakawa | 359/73 |

FOREIGN PATENT DOCUMENTS

| | | | |
|---|---|---|---|
| 297841 | 1/1989 | European Pat. Off. | 359/73 |
| 367288 | 5/1990 | European Pat. Off. | 359/73 |
| 57-30808 | 2/1982 | Japan . | |

Primary Examiner—Jeffery Thurlow
Assistant Examiner—Mathieu Vargot
Attorney, Agent, or Firm—Sughrue, Mion, Zinn Macpeak & Seas

[57] ABSTRACT

A method for manufacturing a retardation film having a suitable retardation using a film casting method but without requiring any special heat-treating process. The post-drying process in the film casting method is divided into three or more chambers, and the tension applied to the film is controlled under the condition that the tension does not exceed a yield value determined based on the amount of solvent content and the temperature of the film in each of the chambers, so that stretch of the film is carried out under the above condition and, if necessary, under the condition that the solvent content is not more than 10%.

8 Claims, 1 Drawing Sheet

METHOD FOR MANUFACTURING RETARDATION FILM

BACKGROUND OF THE INVENTION

The present invention relates to a method for manufacturing an optical film, and particularly relates to a method for manufacturing a so-called retardation film using a casting film forming method.

Plastic films have been used as conventional retardation films triacetate films, polyacryl resin films, polycarbonate films, and the like have been employed due to their superior optical transparency and small orientation, due to properties such as their ease of adherence. (See Japanese Patent Unexamined Publication No. Sho. 57-30808). However, conventional films formed using the casting film forming method result in optical anisotropy. Due to these deficiencies, it was necessary in the conventional practice to subject films formed by the above method to a heat treatment so as to reduce the amount of orientation to thereby equalize the retardation.

Additionally, conventional methods have a problem in manufacturing efficiency because an additional step for heat treatment is required for reducing the retardation.

SUMMARY OF THE INVENTION

It is therefore an object of the present invention to overcome the above problems in the prior art and provide a method for manufacturing a retardation film having a suitable retardation by using a casting film forming method but without requiring any heat treatment step.

In order to attain the above and other objects, the present invention provides a method for manufacturing a retardation film comprising the steps of casting a solution of polymer dissolved in an organic solvent over a moving support formed by an endless metal plate to form a viscous film on the support, drying the film, stripping off the dried film from the support, and further drying the stripped film to form a finished retardation film, which method is characterized in that the tension applied to the film and the drying temperature are controlled under conditions in which the yield value of the film, as determined in accordance with the amount of solvent content in and temperature of the film, is not exceeded.

The above method is further characterized in that when the solvent content is not more than 10%, the temperature is raised so as to lower the yield value of the film to thereby perform a desired stretch.

The retardation films manufactured according to the present invention include not only films of polycarbonate, but also films made of polystyrene, poly(methyl methacrylate), polypropylene, poly(vinyl chloride), styrene-acrylonitrile copolymer, polyethylene, polyacrylate, polyether sulfone, polyphenylene oxide, diacetyl cellulose, etc.

According to the present invention, in a method for manufacturing a retardation film comprising the steps of casting a solution of polymer dissolved in an organic solvent over a support formed by a moving endless metal plate to form a viscous film on the support, drying the film, stripping off the dried film from the support, and further drying the stripped film into a finished retardation film, it is preferable that the support be heated from the rear surface thereof by a radiant-heat source, and that the viscous film on the front surface of the support be heated and dried only by the radiation heat source, that is, without the use of a drying air flow, until the amount of solvent content contained in the viscous film becomes 35 weight percent or less.

In accordance with the inventive method, heating the rear surface of the support with a radiation heat source means that the whole of the rear surface of the support is subjected to infrared heating or high-frequency heating, or heating by a steam heater, a dielectric heater, or the like. This method is much different from the conventional method in that the heat used for evaporating the solvent from the film surface is fed from the rear surface of the film. As a result, the temperature of the viscous film rises higher on the rear surface side than on the front surface side. This is to be compared with the conventional method in which only the front surface side of the support is dried by a hot air flow while the rear surface side of the film is left to be cooled by evaporation of the solvent. The inventive method is therefore advantageous as a whole in movement of the solvent to the front surface side for evaporation.

The reason why the viscous film on the front surface of the support is heated and dried only by a radiation heat source without using a drying air flow until the solvent content of the film becomes 35 weight percent or less is as follows: In the case where the amount of solvent content is equal to or more than 35 weight percent, if the film is dried with a hot air flow, the surface of the film is caused to be uneven due to local differences in the convection of the dying air flow on the film surface. (This has been found to be a cause of unevenness in drying in the conventional case, that is, due to differences in the flow of the drying air flow on the film surface, uneven convection results in differences in the drying rate of the boundary film.)

In the present method, however, the film on the surface side of the support is heated and dried only by the radiation heat source without the use of a drying air flow. As a result, the present method is significantly different from the conventional method in that the entire surface of the film can be gradually and evenly dried by the evaporation caused only by the rising of the temperature of the film per se. Accordingly, the inventive method has a feature that natural evaporation is caused on the whole surface by heating the film only by radiation heat.

Thus, it is important to provide a radiation heat source with which the surface of the film can be irradiated evenly, and it is necessary to control the upper limit of the temperature so that the film does not foam.

In the inventive method, if the amount of solvent content of the film is equal to or less than 35 weight percent, the possibility of unevenness in drying does not arise, so that the film can be forcibly dried with the use of a hot air flow, as in the conventional case. On the contrary, if the solvent content is greater than 35 weight percent, the film on the front surface side is not subjected to hot-air-flow drying, but radiation heating is performed from both the front and rear surfaces in an atmosphere containing a high concentration of the solvent (because dry air is not used), so that the whole surface of the film is gradually dried on the support to thereby reduce the amount of solvent content to 35 weight percent or less. Then, after being stripped off from the support, the drying of the film is completed in a post-drying apparatus.

As the organic solvent to be used according to the present invention for the above-mentioned polymer, acetone, methyl ethyl ketone, methylene chloride, toluene, or the like may be used.

Further, the endless metal plate support according to the present invention may be either in the form of a band or a drum. According to the present invention, it is more effective, however, to use a casting apparatus in which the support is in the form of a belt having a long path.

The feature whereby the tension applied to the film and the drying temperature are controlled such that the yield value of the film, as determined in accordance with the amount of solvent content contained in and temperature of the film, is not exceeded provides the following effects: For example, the temperature and yield value of a polycarbonate film may have a relation therebetween as shown in FIG. 2 such that, when the solvent content is, for example, 15%, 10% and 5%, the yield value is 4.5 kg/cm$^2$, 12 kg/cm$^2$, and 55 kg/cm$^2$, respectively, at 100° C. Accordingly, the tension applied on the film can be raised without exceeding the yield value. For example, if the yield point is not higher than 13 kg/cm$^2$ (constant tension), the temperature can be raised in accordance with the amount of the solvent content contained in the film, that is, the temperature can be successively raised to 35° C., 55° C., 75° C., 100° C., and 130° C. corresponding to respective values of the solvent content of 25%, 20%, 15%, and 10%, to thereby promote efficiency in drying.

Further, the feature of the invention whereby the temperature is raised so as to reduce the yield value of the film to thereby perform a desired stretch when the solvent content is equal to or less than 10% means that, for example, if the temperature is raised to 130° C., in the case where the amount of solvent content is 10% and the yield value is 12 kg/cm$^2$ at 100° C., the yield value is reduced to 2 kg/cm$^2$. As a result, the film can be suitable stretched by the existing tension. Thus, suitable stretch can be continuously performed within a single process by application of a suitable amount of tension.

For controlling the tension applied to the film and the drying temperature such that the yield value of the film, determined in accordance with the amount of solvent content in and temperature of the film, is not exceeded, and for raising the temperature in such a manner as to lower the yield value of the film to effect a desired amount of stretch when the amount of solvent content is equal to or less than 10%, it is preferable that the post-drying process be divided among three small chambers, more preferably, five or more chambers, the temperature being raised step by step in the respective chambers to thereby improve the drying efficiency, and for the desired stretch to be performed in the chamber in the later stage. For example, as shown in FIG. 1, a post-drying process 2 following a casting machine 1 is divided into five chambers (4, 5, 6, 7, 8), and a suitable temperature is maintained in each chamber corresponding to a safe amount of tension so that the yield value is not exceeded during the successive reduction of the solvent content of the film. This approach improves the drying efficiency. The temperature in the fourth and fifth chambers 7 and 8 is further successively raised so as to perform a desired amount of stretch to thereby obtain a suitable retardation.

DESCRIPTION OF THE PREFERRED EMBODIMENTS

Referring to specific examples, the effects of the present invention now will be described in more detail.

Example 1

Figure 1:
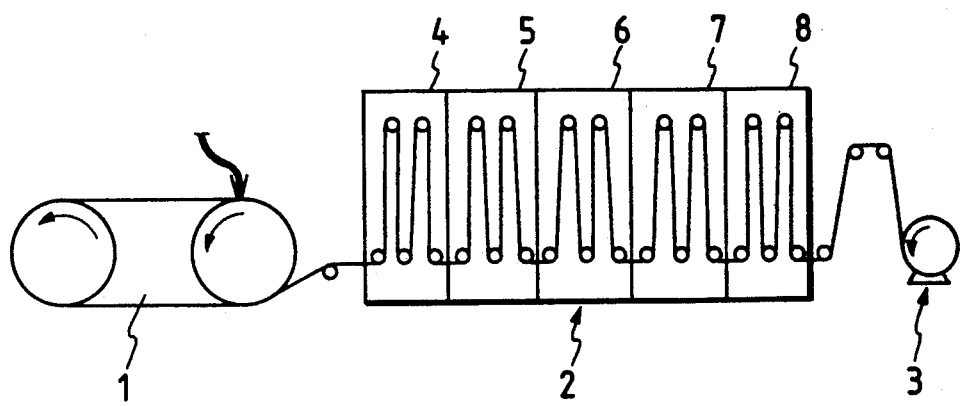
FIG. 1 is a side view of a preferred embodiment of an apparatus for carrying out the manufacturing method according to the present invention.

In a film casting apparatus as shown in FIG. 1, a methylene chloride solution of polycarbonate of 18 weight percent was prepared as a polymer solution, the prepared solution was caused to cast over a support (a band), the casting material was dried so that a solvent content becomes equal to or less than 25%, and the dried matter was stripped off from the support, that is, from the casting machine 1 so as to enter the post-drying process 2. The post-drying process was divided into five chambers, the respective temperatures of which were set on the basis of the yield values corresponding to the respective maximum values of solvent content (the quantity of solvent on the reference of the solid component) in the respective chambers. The dried material was then taken up by a winder 3. The solvent content, the temperatures, and the yield values under such conditions in each of the drying chambers were as follows.

| Position | Amount of Solvent Content (%) | Temperature (°C.) | Yield Value (kg/cm$^2$) |
|---|---|---|---|
| Stripping-off portion | 25 | 30 | 20 |
| First chamber | 20 | 40 | 30 |
| Second chamber | 18 | 50 | 19 |
| Third chamber | 10 | 85 | 30 |
| Fourth chamber | 6 | 110 | 32 |
| Fifth chamber | 5 | 110 | 40 |
| Winding position | 4 | Room Temp. | — |

The tension value (T) was set so as not to exceed the value obtained by multiplying the above-listed yield value kg/cm$^2$ (K) of each chamber by a film sectional area (S) as follows:

$$T \leq K \times S$$

In this case, the tension values may be selected individually for every chamber, or may all be set to the weakest yield value 19 kg/cm$^2$ (the second chamber) of all the yield values.

Under the above-stated manufacturing conditions, a retardation film of excellent quality could be manufactured.

Comparative Example 1

When the temperature of the second chamber was raised from 50° C. to 70° C. in order to make the drying rate high, the film was stretched in the second chamber to the extent that the width of the product was made too narrow and the retardation was much larger than the aimed value. Accordingly, the film was not suitable as a retardation film. The yield value of the second chamber was 6 kg/cm² at 70° C.

At this time, although the tension used in the process was reduced, the tension was so low that the rotation of the conveying rollers against the film resulted in problems such as the generation of scratches, defective conveying, etc.

Example 2

Owing to the effects described above, film stretch can be performed in the chambers by controlling the temperature and tension in each chamber. That is, film stretch is carried out in the latter half of the chamber in accordance with the target retardation value in the process of winding of the film. With this arrangement, the stretching step following the winding step can be omitted.

Figure 2:
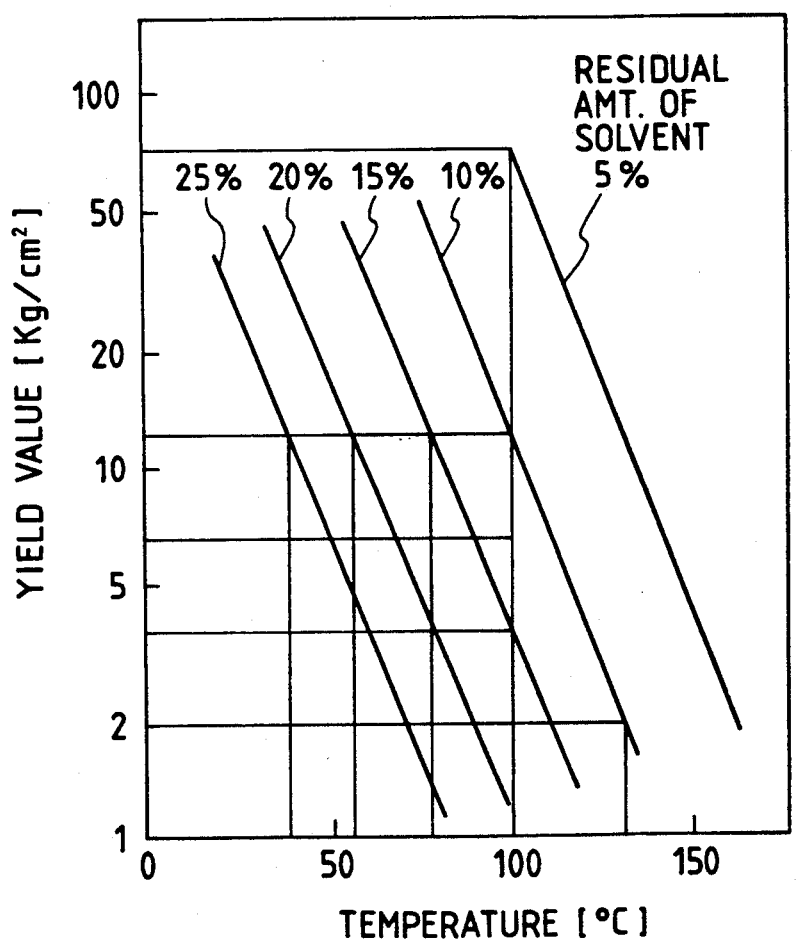
FIG. 2 is a graph showing the relation between the temperature and the yield value of the solvent content of a polycarbonate film.

In this case, the lower the amount of solvent content, the better the orientation characteristic, and, therefore, it is preferable to stretch the film in the latter half of the post-drying process. If, for instance, the temperature of the fourth chamber is set to 140° C., the yield value is lowered to 7 kg/cm², as indicated in FIG. 2. This yield value is much lower than that in the other chambers, so that the yield value in the fourth chamber becomes lower than the tension in the film. However, when the tension was made not lower than the yield value and the speed of the film between the third chamber and the fifth chamber was raised by 12%, a film having a retardation of 570 nm was obtained at the winding portion.

Example 3

In the case where a 25% methylene chloride solution of a styrene-acrylonitrile copolymer was subjected to casting in a casting method similar to the method described above, the film was overly stretched under the temperature conditions corresponding to the solvent content in Example 1, and therefore a desired film could not be obtained because the glass transition point of this material was lower than that of polycarbonate.

When the drying temperature of each of the chambers was lowered by 10°-20° C., products could be obtained within the range of application of the step tension.

In the retardation-film manufacturing method according to the present invention, in the process for post-drying the film stripped off from the support, the drying temperature is stepwise determined corresponding to the tension acting on the film on the basis of the yield value determined in accordance with the amount of solvent content in and temperature of the film. Accordingly, the film is not undesirably stretched during the process, and an even retardation film suitable for optical use can be obtained. Further, the film can be suitably stretched by selecting the conditions under which the temperature and the tension are set in the post-drying process, so that it becomes possible to obtain a desired retardation value in a single process.

Further, in the manufacturing method according to the present invention, there is no increase in the number of steps required in the manufacturing process, so that production efficiency can be improved with the use of the invention.

What is claimed is:

1. A method for manufacturing a retardation film comprising the steps of: casting a solution of polymer dissolved in an organic solvent so as to cast over a support formed by a running endless metal plate to form thereon a viscous film; drying said film; stripping-off the dried film from said support; further drying the stripped film into a finished retardation film; controlling a tension applied to said film and controlling a drying temperature of said film during said step of further drying such that a yield value of said film is not exceeded, said yield value being determined in accordance with an amount of solvent content remaining in said film and a temperature of said film; and raising the temperature of said film in said step of further drying so as to lower the yield value of said film to perform a desired stretch of said film when said amount of said solvent content is not more than a predetermined value.

2. The method of manufacturing a retardation film according to claim 1, wherein said predetermined value of said solvent content is approximately 10%.

3. The method for manufacturing a retardation film according to claim 1, further comprising the step of, when said amount of said solvent content in said viscous film is not more than approximately 35%, drying said film with a flow of hot air.

4. The method for manufacturing a retardation film according to claim 1, further comprising the step of heating said endless metal plate from a side thereof opposite to said viscous film.

5. The method for manufacturing a retardation film according to claim 4, wherein said step of heating said endless metal plate is continued until said amount of solvent content in said viscous film is not more than approximately 35%.

6. The method for manufacturing a retardation film according to claim 5, further comprising the step of, after said amount of solvent content in said viscous film has become less than approximately 35%, drying said film with a flow of hot air.

7. The method for manufacturing a retardation film according to claim 1, further comprising the step of heating said endless metal plate from a side thereof opposite to said viscous film while simultaneously heating said film on said endless metal plate with a radiation heater.

8. The method for manufacturing a retardation film according to claim 1, wherein said step of further drying comprises passing said film through a plurality of drying chambers, a temperature in said drying chambers being successively increased at least between ones of said chambers in a later half of said chambers in a direction in which said film passes through said chambers.

* * * * *